United States Patent [19]

Pischinger

[11] 4,363,302
[45] Dec. 14, 1982

[54] FEED CONTROL BY MEANS OF A FLAT SLIDE VALVE

[75] Inventor: Franz Pischinger, Aachen, Fed. Rep. of Germany

[73] Assignee: Klöckner-Humboldt-Deutz Aktiengesellschaft, Cologne, Fed. Rep. of Germany

[21] Appl. No.: 169,821

[22] Filed: Jul. 17, 1980

[30] Foreign Application Priority Data

Jul. 19, 1979 [DE] Fed. Rep. of Germany ....... 2929195

[51] Int. Cl.³ .............................................. F02B 3/00
[52] U.S. Cl. .................................... 123/337; 123/403; 123/590
[58] Field of Search ............... 123/337, 402, 403, 405, 123/336, 442, 590; 261/64 R

[56] References Cited

U.S. PATENT DOCUMENTS

| 1,664,747 | 4/1928 | Kamensky | 123/337 |
| 1,790,854 | 3/1931 | Defrance et al. | 123/590 |
| 2,333,150 | 11/1943 | Bowen | 123/590 |
| 2,454,900 | 11/1948 | Vaug | 123/590 |
| 4,124,012 | 11/1978 | Fuller, Jr. | 123/403 |

FOREIGN PATENT DOCUMENTS

| 485401 | 10/1917 | France | 123/403 |
| 371399 | 5/1939 | Italy | 123/403 |
| 5737 | of 1908 | United Kingdom | 123/405 |

*Primary Examiner*—P. S. Lall
*Attorney, Agent, or Firm*—Becker & Becker, Inc.

[57] ABSTRACT

A device for feed control of valve-controlled internal combustion engines, with the combustion chamber capable of being closed off by an intake valve toward the intake passage, and with a further shutoff element being provided in the intake passage. This further shutoff element is a slotted flat slide valve which is movable in an oscillating manner and cooperates with counter slots. The counter slots are formed by vanes arranged in the housing. The flat slide valve is drivable by a cam.

18 Claims, 3 Drawing Figures

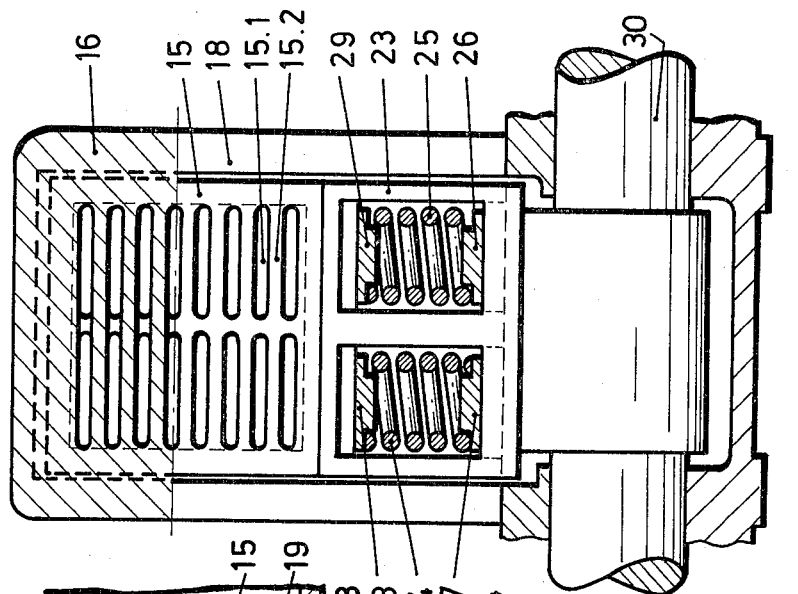
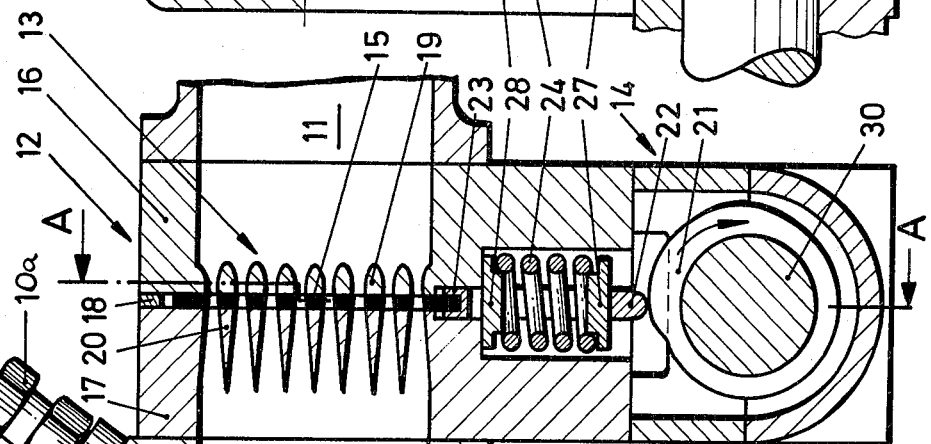
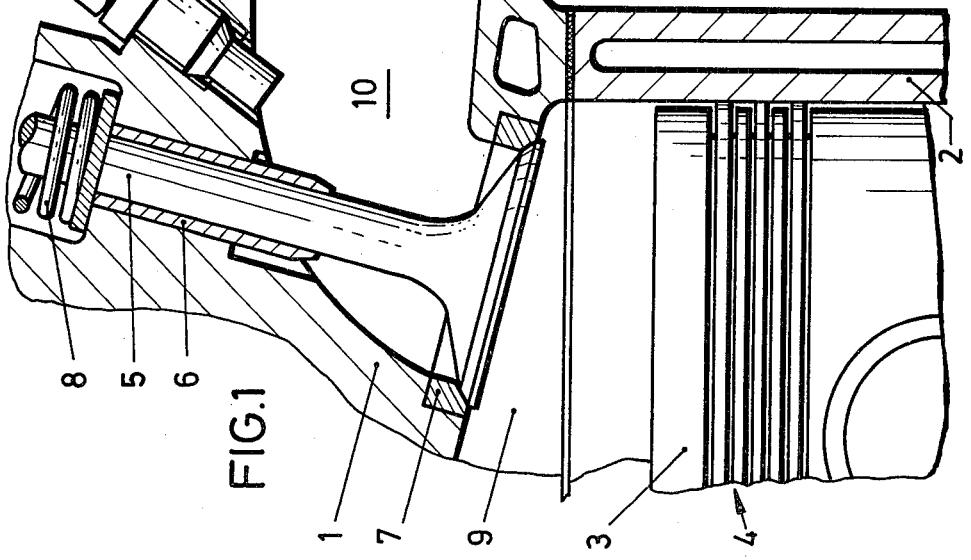

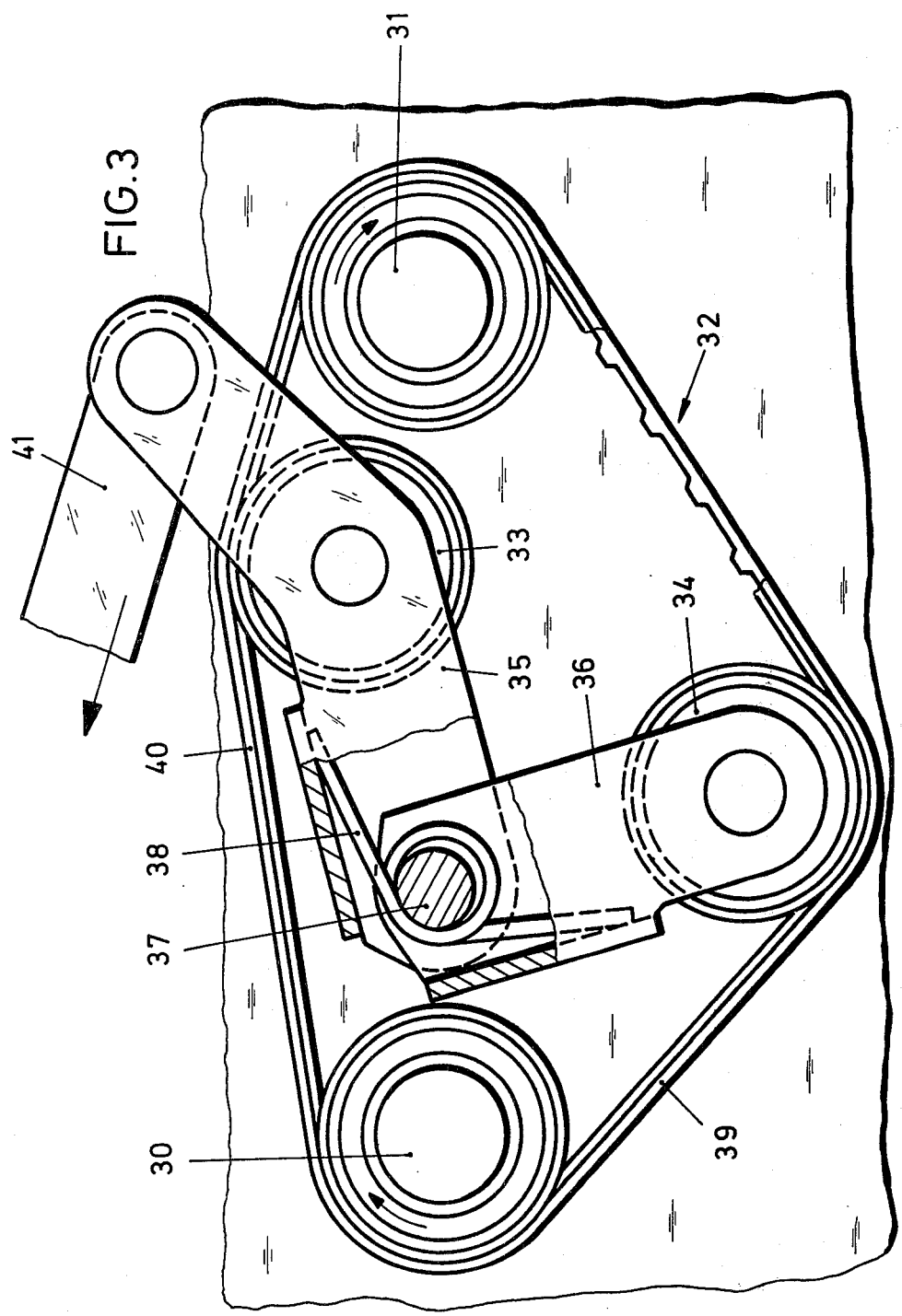

FEED CONTROL BY MEANS OF A FLAT SLIDE VALVE

The present invention relates to a device for feed control or regulation of valve-controlled internal combustion engines, with the combustion chamber capable of being closed off by an intake valve toward the intake passage, and with a further shutoff element being provided in the intake passage.

The feed control of suctioning and supercharged internal combustion engines occurs conventionally by variable throttling, i.e. variable pressure in the inlet pipe. This type of feed control, especially at partial load and idling, results in high suction losses which must be equalized or balanced by higher output in the high pressure part of the operating process. These losses could be avoided if the necessary fresh gas quantity is suctioned at ambient pressure or at charging pressure, and thereafter the intake passage is blocked or shut off. The expansion work undertaken on the confined mixtures or fresh gas, after the intake passage is shut off, is regained again during the subsequent compression, so that no charge-change losses result from the mixture suctioning or the fresh air suctioning.

If an attempt is made to realize or obtain this type of regulation or control by conventional control elements (valve, slide valve) with variable control time, then losses result thereby that the shutoff element, in opened condition or by slow closing, causes a throttling. Additionally, the previously suggested mechanical devices for variable valve opening are expensive (German Offenlegungsschrift No. 24 56 752).

These disadvantages are also not avoided if a roller-like rotary slide valve with continuous rotation is connected in series with the inlet element on the suction side thereof (German Offenlegungsschrift No. 26 21 362), whereby by relative rotation there is attainable that the rotary slide valve already shuts off the intake passage prior to closure of the intake valve. Disadvantageous with this arrangement is also that the space between the slide and the valve, as well as the combustion chamber, must be relatively large, and the configuration of the intake passage cannot be embodied in a manner which is advantageous with respect to the flow.

There is further known from German Offenlegungsschrift No. 26 36 519 and German Offenlegungsschrift No. 26 12 430 to influence the inlet opening times with a slide in the valve seat. This solution, however, is expensive in construction and not operationally certain because of the high mechanical and thermal loading of the slide and valve means.

Another solution, provided by German Offenlegungsschrift No. 26 21 364, is to change the inlet control times by utilizing two sequentially connected valves. The disadvantage of this arrangement consists in that the losses due to throttling are not avoidable.

It is therefore an object of the present invention accordingly to connect a further shutoff element in the intake passage before the intake element (valve); such a shutoff element causes only minimum throttling losses in the medium that is flowing-in as well as in the opened condition and also during closing; and in closed condition reliably seals off the intake passage relative to the combustion chamber with the intake valve still open.

This object, and other objects and advantages of the present invention, will appear more clearly from the following specification in connection with the accompanying drawings, in which:

FIG. 1 is a section taken through a portion of an internal combustion engine showing only one cylinder, the inlet pipe of which is provided with an inventively constructed flat slide valve for feed regulation or control, and the drive camshaft thereof.

FIG. 2 is a section, through the flat slide valve housing with the flat slide valve and its entire actuation, taken along line A—A in FIG. 1; and FIG. 3 illustrates the drive of the flat slide valve cam from the cam-shaft of the gas-reversing valve.

The feed control device of the present invention is characterized primarily in that as a further shutoff element, there is provided a slotted flat slide valve which is movable in an oscillating manner and which cooperates with counter slots. The thus created control slots permit a sudden closing-off of the intake passage with very small slide movements, and therefore practically without throttle losses during shutting off. In spite of the small stroke, the opened slide valve exposes or frees a large flow cross section, so that the flow losses can be kept small even at high air throughflow.

According to a further embodiment of the present invention, the counter slots are formed by vanes arranged in the housing, whereby the housing-integrated counter slots have a higher freedom of design, so that the low-loss suctioning attained with the flat slide valve can be improved still further. A possible configuration of the counter slots involves having the vanes embodied with a wing or airfoil profile in the suction direction, and that the flat slide valve is guided transverse to and in the vanes. Under these circumstances, it is self-understood that the crosspieces of the slide valve in the region of the guide of the flat slide valve have the same thickness as the vane segments in the housing.

The width of the crosspieces, and accordingly of the vane segments, is greater than the width of the slots, so that the flat slide valve in cooperation with the vane segments can reliably shut off the intake passage.

A relatively thin plate, e.g. of metal, can be used as the flat slide valve according to the present invention. For the purpose of moving this relatively thin plate with certainty, and without any deformation thereof, it is practical to hold the flat slide valve in a frame at its drive side end. The advantage of this arrangement consists in that the drive can engage a sufficiently stable element having resistance, so that the flat slide valve can be optimally designed for its special object.

For the purpose of attaining in a simple structure the required oscillating movement of the flat slide valve, it is proposed to use a cam as the drive, whereby the end of the frame toward the cam side is then advantageously embodied as a pushrod. In order to obtain the least possible wear of the pushrod and the cam, in accordance with a further embodiment of the present invention the cam has substantially the same width as the frame. So that the flat slide valve together with its frame can be moved without binding in the guide thereof, and to attain a drive of compact construction, it is further proposed to provide two windows in the frame, in each of which a pressure spring is arranged in order to hold the frame in positive contact with the cam. In this connection, it is advantageous if each pressure spring is respectively supported by a spring disc arranged on the housing and on the frame.

In order to also be able to use the present inventive arrangement with internal combustion engines already in operation, it is furthermore proposed that the cam, the flat slide valve, and the frame be arranged in a housing which is insertable or installable between the intake passage and the cylinder head. In this way, it is possible to arrange the present inventive device on every internal combustion engine without structural changes. In this connection, it is advantageous for finishing-technical reasons that the housing be separated in the plane of the flat slide valve, and that a spacer having a thickness corresponding to that of the slide valve be arranged between the two housing halves. It is furthermore possible that if the flat slide valve gets too much play in the suction direction as a result of wear, to equalize this by utilizing a thinner spacer. Accordingly, it is possible to be able to operate the flat slide valve also over longer operational time without side play.

A toothed belt or a chain with a tensioning roller can be used to drive the cam; two adjusting rollers can be so arranged that the length of the taut and slack strands are changeable. The drive by way of toothed belts and chains is cost-advantageous and low in noise. By way of the adjusting rollers, there can be attained a suitable preadjustment of the camshaft by turning or rotation in the driving or counter-driving direction, so that the opening and closing time points of the flat slide valve can be influenced. The chain or the toothed belt can then be driven in a most simple manner from the camshaft of the internal combustion engine if the latter is already driven by toothed belt or chain means. It is equally possible to drive the toothed belt or the chain from the crankshaft.

In order to also be able to operate an internal combustion engine equipped with the inventive device in motor vehicles, it is necessary to regulate or control the opening and closing time points of the slide valve as a function of the motor speed and the load. This is attained according to a further embodiment of the present invention thereby that the adjusting rollers are pivotable by a suitable power regulating or controlling device of the internal combustion engine. It is further proposed that an adjusting roller be provided for each of the taut and slack strands respectively; the two adjusting rollers are each respectively journalled in a pivot lever having a common pivot or turning point, and are pressed apart by a spring and against the chain or the toothed belt, both pivot levers being actuatable by a single power regulating or controlling device. In this connection, the power regulating or controlling device needs to engage only a single pivot lever if the spring between the two pivot levers only engages the single pivot lever.

Referring now to the drawings in detail, the sectional views according to FIGS. 1 and 2 show a portion of a cylinder head 1 and the cylinder bore 2, a portion of the piston 3 with its piston rings 4, the inlet or intake valve 5 with its guide 6, the valve seat 7, and the valve spring 8. During the high-pressure portion of the combustion process, the intake valve 5, which is controlled in the conventional manner, seals the combustion chamber 9 relative to the inlet or intake passage 10, into which the injection nozzle 10a injects fuel.

Between the intake passage 10 in the cylinder head 1, and the inlet pipe 11, there is arranged an insert 12 which contains the flat slide valve arrangement 13 together with its drive unit or device 14. The flat slide valve arrangement 13 comprises a transverse-slotted flat slide valve 15 which is arranged longitudinally movable between the two housing parts 16, 17. Both housing parts 16, 17 are connected gastight with each other by means of a spacer 18 having a thickness corresponding to that of the flat slide valve 15.

Rib or vane segments 19, 20 are arranged on the housing parts 16, 17 transverse to the sliding or shifting direction of the flat slide valve 15, and in particular in such a manner that the drawn-in air on the one hand can pass unhindered between the vane segments 19, 20 through the slots 15.1 in the flat slide valve 15, and on the other hand the webs or crosspieces 15.2 of the flat slide valve 15 can enter between the vane segments 19, 20 so that the inlet pipe 11 is separated from the intake passage 10. In order to allow the drawn-in air to pass practically without any throttle effect through the flat slide valve arrangement 13, the vane segments 19, 20 have a wing or blade-like shape in the flow-through direction.

The drive device 14 for the flat slide valve 15 comprises a cam 21 which is fastened on a camshaft 30 which is journalled to be rotatably driven. A push rod or striker 22 glides upon the cam 21 and at the same time is a part of a frame 23 (see especially FIG. 2) to which the flat slide valve 15 is secured in a suitable manner. The frame 23 is lifted by the cam 21 against the force of two springs 24, 25, which are arranged in windows in the frame 23 and are supported by spring discs 26, 27 in the frame and by spring discs 28, 29 on the two housing parts or halves 16, 17.

The cam 21 in this example is so embodied that a rapid separating of the intake passage 10 from the inlet pipe 11 can occur by means of the flat slide valve 15, whereas the opening of the flat slide valve 15 proceeds very slowly.

If internal combustion engines having several cylinders located in a row are used, all flat slide valve arrangements with their drive devices or units 14 can be combined in one structural unit, whereby the camshaft 30 for the entire cylinder row can be used for actuation of the flat slide valve.

Since the flat slide valve 15 must always be actuated as a function of the intake valve 5, it is logical to adjust the drive of the camshaft 30 to the camshaft used for actuation of the intake valve.

FIG. 3 illustrates a preferred arrangement of the camshaft 30 and the camshaft 31, which actuates the inlet valve 5. An endless toothed belt 32 serves as the drive. It is naturally likewise possible to provide an endless chain in place of the toothed belt 32. The toothed belt 32 is tensioned by two adjusting rollers 33, 34. Each adjusting roller 33, 34 is respectively journalled in a pivot lever 35, 36, whereby both pivot levers 35, 36 are pivotable about a common pivot pin 37. A helical or spiral spring 38 is wound around the pivot pin 37, and in particular in such a manner that it presses both pivot levers 35, 36 with the adjusting rollers 33, 34 against the toothed belt 32. In this example, the taut strand is designated 40, and the slack strand is designated 39. The length of the taut strand 40 can now be changed by adjustment of the adjusting roller 33 with the pivot lever 35. In this way, the camshaft 30 can be advanced and retracted in a rotational movement relative to the camshaft 31, so that the opening and closing time points of the flat slide valve 15 can be influenced relative to the intake valve 5.

The adjustment of the pivot lever 36 is effected by the lever 41, which is pivotally secured to the pivot lever 35 and leads to a non-illustrated power controlling device of the internal combustion engine. The simultaneous adjustment of the pivot lever 35 with the pivot lever 36 has as a consequence that not only the length of the taut strand 40, but also the length of the slack strand 39, is changed in such a way that the entire length remains constant. Under these circumstances, the spiral spring 38 guarantees that a sufficient belt tension always exists, so that a separate tensioning roller provided only for tensioning the belt is unnecessary. The coordination of the camshaft 30 to the camshaft 31, and the arrangement of the adjusting rollers 33, 34, is such that the angle between the two pivot levers 35, 36, and thus the spring tension, is changed only slightly.

The present invention has been described in the illustrations of FIGS. 1 through 3 only with respect to a mixture-compressing internal combustion engine. It is, however, equally possible to utilize the features of the present invention in the same manner with an air-compressing and/or supercharged internal combustion engine. With air-compressing internal combustion engines, the injection nozzle 10a in the intake passage 10 is naturally omitted, since under such circumstances it is arranged in the main combustion chamber and auxiliary combustion chamber; in any event after the intake valve.

Also, it is not necessary to adjust the drive of the camshaft 30 to the camshaft 31 of the intake valve. It is just as conceivable that other suitable drives can be provided, for example the crankshaft.

The present invention is, of course, in no way restricted to the specific disclosure of the specification and drawings, but also encompassed any modifications within the scope of the appended claims.

What I claim is:

1. A device utilized with a fuel source and a combustion-air source for feed control of valve-controlled internal combustion engines having at least one cylinder and cylinder head arrangement, each of which has a combustion chamber and a housing attached to said cylinder head and provided with an intake passage and an intake pipe for providing communication between said fuel source and combustion-air source and said combustion chamber, each of said cylinder/cylinder head arrangements also being provided with an intake valve for shutting off communication between said combustion chamber and said intake passage, said device comprising a further shut-off element, in the form of a manifold slotted flat slide valve, for shutting off communication between said combustion chamber and said intake pipe, said slide valve being located in said intake passage and said intake pipe, being movable in an oscillating manner, and cooperating with manifold slot-shaped ports in a portion of said housing located in said intake passage and intake pipe.

2. A device utilized with a fuel source and a combustion-air source for feed control of valve-controlled internal combustion engines having at least one cylinder and cylinder head arrangement, each of which has a combustion chamber and a housing attached to said cylinder head and provided with an intake passage and an intake pipe for providing communication between said fuel source and combustion air source and said combustion chamber, each of said cylinder/cylinder head arrangements also being provided with an intake valve for shutting off communication between said combustion chamber and said intake passage, said device comprising a further shut-off element, in the form of a manifold slotted flat slide valve, for shutting off communication between said combustion chamber and said intake pipe, a cam and a frame serving as a pushrod associated with said slide valve, said slide valve being located in said intake passage, being movable in an oscillating manner, and cooperating with manifold slot-shaped ports in a portion of said housing located in said intake passage, said cam having substantially the same width as said frame.

3. A device according to claim 2, in which said slide valve is provided with cross-pieces between the slots thereof, the width of said cross-pieces being greater than the width of said counter slots.

4. A device according to claim 3, in which that portion of said housing located in said intake passage comprises vanes which are spaced from one another, said counter slots being formed by said spaces between said vanes.

5. A device according to claim 4, in which said vanes exhibit favorable flow characteristics in the suction direction, and in which said flat slide valve is guided transverse to and in said vanes.

6. A device according to claim 5, in which said vanes have an air foil profile.

7. A device according to claim 5, which includes the drive side end of said slide valve being held in said frame.

8. A device according to claim 7, which includes said cam associated with said housing for driving said slide valve by means of said frame, said frame being designed as said pushrod.

9. A device utilized with a fuel source and a combustion-air source for feed control of valve-controlled internal combustion engines having at least one cylinder and cylinder head arrangement, each of which has a combustion chamber and a housing attached to said cylinder head and provided with an intake passage and an intake pipe for providing communication between said fuel source and combustion air source and said combustion chamber, each of said cylinder/cylinder head arrangements also being provided with an intake valve for shutting off communication between said combustion chamber and said intake passage, said device comprising a further shut-off element, in the form of a manifold slotted flat slide valve, for shutting off communication between said combustion chamber and said intake pipe, a cam and a frame serving as a pushrod associated with said slide valve, said slide valve being located in said intake passage, being movable in an oscillating manner, and cooperating with manifold slot-shaped ports in a portion of said housing located in said intake passage, said frame being provided with two windows, each of which is provided with a pressure spring arranged therein in such a way that said push-rod is in constant positive contact with said cam.

10. A device according to claim 9, which includes spring discs for supporting said springs on said housing and on said frame.

11. A device according to claim 10, in which said housing includes said cam, said frame, and said slide valve, and is insertable between said intake passage and said cylinder head.

12. A device according to claim 10, in which said housing comprises two parts split in the plane of said slide valve, and which includes a spacer having the thickness of said slide valve and arrangeable between the two parts of said housing.

13. A device according to claim 12, which includes drive means and two adjusting rollers for said cam, said adjusting rollers being arranged in such a way that the length of the taut and slack strands thereof are changeable.

14. A device according to claim 13, in which said drive means is a chain.

15. A device according to claim 13, in which said drive means is a toothed belt.

16. A device according to claim 13, in which said internal combustion engine includes a power regulating device, said adjusting rollers being pivotable thereby.

17. A device according to claim 16, which includes an adjusting roller for each of said taut and slack strands, and which includes respective pivot levers for respectively supporting each of said adjusting rollers, said pivot levers having a common pivot point, and which includes a spring for pressing said adjusting rollers apart and against said drive means, both of said pivot levers being actuatable by said power regulating device.

18. A device according to claim 17, in which said two pivot levers press against said taut and slack strands with said adjusting rollers by means of a common spring, and in which said power regulating device engages one of said pivot levers.

* * * * *

UNITED STATES PATENT AND TRADEMARK OFFICE
CERTIFICATE OF CORRECTION

PATENT NO. : 4,363,302
DATED : 14 December 1982
INVENTOR(S) : FRANZ PISCHINGER

It is certified that error appears in the above—identified patent and that said Letters Patent is hereby corrected as shown below:

On the Title-Abstract Page, please delete the following:

(73) Assignee: Klöckner-Humboldt-Deutz Aktiengesellschaft, Cologne, Fed. Rep. of Germany Signed and Sealed this Twelfth Day of April 1983

[SEAL]

Attest:

GERALD J. MOSSINGHOFF

Attesting Officer

Commissioner of Patents and Trademarks